US011790890B2

(12) United States Patent
Aggarwal et al.

(10) Patent No.: US 11,790,890 B2
(45) Date of Patent: Oct. 17, 2023

(54) LEARNING OFFLINE VOICE COMMANDS BASED ON USAGE OF ONLINE VOICE COMMANDS

(71) Applicant: GOOGLE LLC, Mountain View, CA (US)

(72) Inventors: Vikram Aggarwal, Palo Alto, CA (US); Moises Morgenstern Gali, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/521,472

(22) Filed: Nov. 8, 2021

(65) Prior Publication Data
US 2022/0059078 A1    Feb. 24, 2022

Related U.S. Application Data

(63) Continuation of application No. 15/862,615, filed on Jan. 4, 2018, now Pat. No. 11,170,762.

(51) Int. Cl.
*G10L 21/00* (2013.01)
*G10L 25/00* (2013.01)
(Continued)

(52) U.S. Cl.
CPC ............ *G10L 15/07* (2013.01); *G10L 15/19* (2013.01); *G10L 15/22* (2013.01); *G10L 15/30* (2013.01);
(Continued)

(58) Field of Classification Search
CPC ......... G10L 15/22; G10L 15/20; G10L 15/26; G10L 2015/223; G10L 15/30;
(Continued)

(56) References Cited

U.S. PATENT DOCUMENTS 6,195,641 B1    2/2001  Loring et al.
6,873,951 B1    3/2005  Lin et al.
(Continued)

FOREIGN PATENT DOCUMENTS

CN    101075434    11/2007
CN    101454775    6/2009
(Continued)

OTHER PUBLICATIONS

European Patent Office; International Search Report issued in Application No. PCT/US2019/012399; 14 pages; dated Apr. 11, 2019.

(Continued)

*Primary Examiner* — Olujimi A Adesanya
(74) *Attorney, Agent, or Firm* — Gray Ice Higdon (57) ABSTRACT

Methods, systems, apparatus, including computer programs encoded on a computer storage medium, for a user device to learn offline voice actions. In one aspect, the method includes actions of detecting, by the user device, an utterance at a first time when the user device is connected to a server by a network, providing, by the user device, the utterance to the server using the network, receiving, by the user device and from the server, an update to the grammar of the user device, detecting, by the user device, a subsequent utterance of the utterance at a second time when the user device is not connected to the server by a network, and in response to detecting, by the user device, the subsequent utterance of the utterance at the second time, identifying, by the user device, an operation to perform based on (i) the subsequent utterance, and (ii) the updated grammar.

20 Claims, 5 Drawing Sheets

(51) Int. Cl.
*G10L 15/07* (2013.01)
*G10L 15/22* (2006.01)
*G10L 15/19* (2013.01)
*G10L 15/32* (2013.01)
*G10L 15/30* (2013.01)

(52) U.S. Cl.
CPC ........ *G10L 15/32* (2013.01); *G10L 2015/228* (2013.01)

(58) Field of Classification Search
CPC ....... G10L 2015/0635; G10L 2015/088; G10L 15/1822; B60R 25/257; B60R 16/0373; B60R 16/037
See application file for complete search history.

(56) References Cited

U.S. PATENT DOCUMENTS

| | | | | |
|---|---|---|---|---|
| 8,185,392 | B1* | 5/2012 | Strope | G10L 15/01 704/251 |
| 8,370,146 | B1* | 2/2013 | Schalkwyk | G10L 15/1815 704/235 |
| 9,070,367 | B1 | 6/2015 | Hoffmeister et al. | |
| 9,836,527 | B2 | 12/2017 | Gao et al. | |
| 2002/0077823 | A1* | 6/2002 | Fox | G06F 8/34 704/260 |
| 2003/0046074 | A1 | 3/2003 | Ruback et al. | |
| 2005/0096753 | A1 | 5/2005 | Ming et al. | |
| 2005/0105712 | A1 | 5/2005 | Williams et al. | |
| 2007/0005360 | A1 | 1/2007 | Huning et al. | |
| 2007/0073540 | A1 | 3/2007 | Hirakawa et al. | |
| 2007/0276651 | A1 | 11/2007 | Bliss et al. | |
| 2008/0235021 | A1* | 9/2008 | Cross | G10L 15/19 704/257 |
| 2009/0112605 | A1* | 4/2009 | Gupta | G01C 21/3608 704/E21.001 |
| 2010/0179812 | A1 | 7/2010 | Jang et al. | |
| 2012/0179471 | A1 | 7/2012 | Newman et al. | |
| 2013/0073293 | A1 | 3/2013 | Jang et al. | |
| 2013/0088419 | A1 | 4/2013 | Kim et al. | |
| 2013/0132089 | A1 | 5/2013 | Fanty et al. | |
| 2014/0136013 | A1* | 5/2014 | Wolverton | B60K 37/06 701/1 |
| 2014/0200737 | A1* | 7/2014 | Lortz | B60R 16/037 701/1 |
| 2014/0244259 | A1* | 8/2014 | Rosario | G10L 15/08 704/254 |
| 2014/0274203 | A1 | 9/2014 | Ganong, III et al. | |
| 2014/0337007 | A1 | 11/2014 | Waibel et al. | |
| 2015/0045988 | A1* | 2/2015 | Gusikhin | G07C 9/00571 701/2 |
| 2015/0281401 | A1 | 10/2015 | Le et al. | |
| 2016/0094509 | A1 | 3/2016 | Ye | |
| 2016/0155443 | A1 | 6/2016 | Khan et al. | |
| 2016/0179462 | A1 | 6/2016 | Bjorkengren | |
| 2016/0269524 | A1 | 9/2016 | Stottlemyer | |
| 2016/0322044 | A1 | 11/2016 | Jung et al. | |
| 2016/0350320 | A1 | 12/2016 | Sung et al. | |
| 2017/0069312 | A1 | 3/2017 | Sundararajan et al. | |
| 2017/0162204 | A1 | 6/2017 | Wilson et al. | |
| 2018/0122365 | A1 | 5/2018 | Kunitake et al. | |
| 2018/0174580 | A1* | 6/2018 | Kim | G10L 15/22 |
| 2018/0217810 | A1 | 8/2018 | Agrawal | |
| 2019/0019516 | A1* | 1/2019 | Van Hoecke | G10L 15/22 |
| 2019/0108832 | A1 | 4/2019 | Tomar et al. | |
| 2019/0206388 | A1* | 7/2019 | Aggarwal | G10L 15/19 |

FOREIGN PATENT DOCUMENTS

| | | |
|---|---|---|
| CN | 101588417 | 11/2009 |
| CN | 107093425 | 8/2017 |
| WO | 2016191319 | 12/2016 |

OTHER PUBLICATIONS

China National Intellectual Property Administration; Notification of First Office Action issued in Application No. 201980011141.4; 30 pages; dated Dec. 5, 2022.
European Patent Office; Communication issued in Application No. 19701422.8, 4 pages, dated Oct. 20, 2022.
European Patent Office; Communication pursuant Article 94(3) EPC issued in Application No. 19701422.8; 4 pages; dated Jul. 6, 2023.
China National Intellectual Property Administration; Notification of Second Office Action issued in Application No. 201980011141.4; 7 pages; dated Jul. 20, 2023.

* cited by examiner

LEARNING OFFLINE VOICE COMMANDS BASED ON USAGE OF ONLINE VOICE COMMANDS

BACKGROUND

People are relying on their user devices to perform a variety of different tasks. User devices may include, for example, a smartphone, a smartwatch, a tablet computer, a smart speaker, a headset, a car, a television, a thermostat, or the like. Such devices may include hardware and software that are configured to enable digital assistant functionality. Such applications are generally referred to as "digital assistants."

Digital assistant functionality may include using a speech recognizer to detect an utterance that is uttered by a user and using the grammar of the speech recognizer to identify an operation that should be performed based on the detected utterance. Such assistant functionality can be generally broken down into online and offline functionality. Online functionality may include commands such as "what is the weather like in Paris today?," "Order a large pizza for me," or the like. Such commands require an active network connection and information from one or more servers access via the network.

In many systems, offline functionality is limited to a subset of commands that do not require network connectivity. For example, offline digital assistant functionality may be limited to a subset of commands such as "play 101.5 FM," "increase volume," "turn on air conditioner," or the like.

SUMMARY

The present disclosure is directed towards a system and method for updating the grammar of a speech recognizer that is stored on a user device and used to execute offline voice commands. In general, one innovative aspect of the subject matter described in this specification can be embodied in methods that include the actions of detecting, by a user device, an utterance at a first time when the user device is connected to a server by a network, wherein the utterance includes one or more terms, providing, by the user device, the utterance to the server using the network, receiving, by the user device and from the server, an update to the grammar of the user device based on the one or more terms, detecting, by the user device, a subsequent utterance at a second time when the user device is not connected to the server by a network, wherein the subsequent utterance includes the one or more terms, and in response to detecting, by the user device, the subsequent utterance at the second time: determining, by the user device, that the subsequent utterance is associated with an operation that can be performed without requesting information from the server, identifying, by the user device, an operation to perform based on (i) the one or more terms of the subsequent utterance, and (ii) the updated grammar, and initiating, by the user device, performance of the operation without requesting information from the server. Other embodiments of this aspect include corresponding systems, apparatus, and computer programs, configured to perform the actions of the methods, encoded on computer storage devices.

These and other versions may optionally include one or more of the following features. For example, in some implementations, initiating by the user device, performance of the operation without requesting information from the server may include generating, by the user device, an action comprising a data object that, when executed, causes the user device to initiate performance of an operation responsive to the subsequent utterance, and executing, by the user device, the action to trigger performance of the operation without requesting information from the server.

In some implementations, the method may also include actions of receiving, by the user device, an action. The action may include a data object that, when executed, causes the user device to initiate performance of an operation responsive to the subsequent utterance, wherein the action was generated by the server, and storing, by the user device, the action on the user device.

In some implementations, initiating by the user device, performance of the operation without requesting information from the server may include accessing, by the user device, the action that is stored on the user device, and executing, by the user device, the action to trigger performance of the operation without requesting information from the server.

In some implementations, receiving, by the user device and from the server, an update to the grammar of the user device based on the one or more terms may include receiving, by the user device, the one or more terms, and updating the grammar of the user device to include the one or more terms.

In some implementations, the one or more terms are associated with a threshold amount of time that indicates a maximum period of time the one or more terms will be included in the grammar absent the user device detecting the subsequent utterance of the one or more terms by a user.

In some implementations, the method may also include actions of determining, by the user device, that the threshold period of time has been exceeded without the user device detecting the subsequent utterance of the one or more terms by the user, and removing, by the user device, the one or more terms from the grammar of the user device.

Another innovative aspect of the subject matter described in this specification can be embodied in methods that include the actions of processing, by a server, a transcription of an utterance that was detected by a first user device when the server and the first user device are connected by a network, determining, by the server based on the processing of the transcription of the utterance, an operation that can be performed by the first user device without requesting information from the server, wherein the transcription includes one or more terms, and providing, by the server, an update to the grammar of the first user device based on the one or more terms. Other embodiments of this aspect include corresponding systems, apparatus, and computer programs, configured to perform the actions of the methods, encoded on computer storage devices.

These and other versions may optionally include one or more of the following features. For example, in some implementations, providing, by the server, an update to the grammar of the first user device based on the one or more terms may include providing the one or more terms to the first user device.

In some implementations, the method may also include actions of associating the one or more terms with a predetermined time period, wherein the predetermined time period indicates a maximum period of time the one or more terms will be included in the grammar absent the subsequent utterance of the one or more terms by a user to perform the operation.

In some implementations, determining, by the server based on a transcription of the utterance, an operation that can be performed by the first user device without requesting information from the server may include generating, by the server, a data object that, when executed, causes the first user device to initiate performance of an operation responsive to the received utterance.

In some implementations, providing, by the server, the update to the grammar of the first user device, based on the one or more terms may include providing the generated data object to the first user device.

In some implementations, the update to the grammar enables the first user device to execute a data object that initiates performance of the operation in response to a subsequent receipt of the utterance without requesting information from the server.

In some implementations, the method may also include actions of identifying, by the server, a user profile that is associated with the first user device, identifying, by the server based on the user profile, a second user device that is registered to a user of the first user device, and providing, by the server, an update to the grammar of the second user device based on the one or more terms.

Particular embodiments of the subject matter described in this specification can be implemented so as to realize one or more of the following advantages. Updating the grammar of a speech recognizer using the system and method of the present disclosure enables the speech recognizer to learn personalized commands that can be used to execute offline voice commands. This provides the advantage of enabling a user to command a digital assistant using the user's own personalized language. If a user can utter commands that can be detected by a speech recognizer in the user's own personalized language and get positive results from applications that receive input commands detected by the speech recognizer, this will increase the likelihood that a user will use applications that can encourage voice input such as digital assistant applications relative to the use of such applications when a user is required memorize a set of standard commands made available to all users of the digital assistant.

The present disclosure provides another advantage in that the learning of personalized commands is achieved as a result of automated processes employed the systems and methods of the present disclosure. That is, a user does not need to initiate the personalization processes. Instead, the personalization of the speech recognizer's grammar can be achieved based on the normal operation of the system based in part on user commands and system responses.

In addition to encouraging a user to user applications that receive input commands detected by the speech recognizer, the present disclosure also improves the functionality of a computer. The updating of the grammar of the speech recognizer that is stored on the user device allows for an increase in the number commands that can be detected by the speech recognizer and executing using one or more control systems employed by the user device. As such, this require less consultation with a server accessible via network to disambiguate a previously unknown voice command, prompt a user for feedback that is used to help disambiguate the unknown voice command, and then receive data object from the server that can be processed by one or more control systems on the user device to execute a particular action (e.g., turn on air conditioner, turn off air conditioner, tune radio to a particular radio station, increase volume, turn off lights, or the like). Less consultation with a networked server results is the usage of less network bandwidth and a reduction in latency that is involved to execute a command from the time the command is initially uttered.

Yet other advantages may be achieved by the present disclosure. For example, a user device such as a phone, entertainment and climate system of an automobile, or the like, will have to contact a server less s to disambiguate uttered commands once the local grammar has been updated. As a result, the user device has to communicate with one or more networks less, resulting in battery savings. By way of another example, a user device utilizing the present disclosure has to use less CPU resources and less storage space storing additional offline Language Packs. In some implementations, this may reduce the amount of downloads and storage of language packs to as little as 40 Mb downloads of Language pack. By way of another example, the server itself has to do less processing to create these large Language packs, which can have a cumulative effect as more languages are being added to grammar of a speech recognizer.

DETAILED DESCRIPTION

Figure 1:
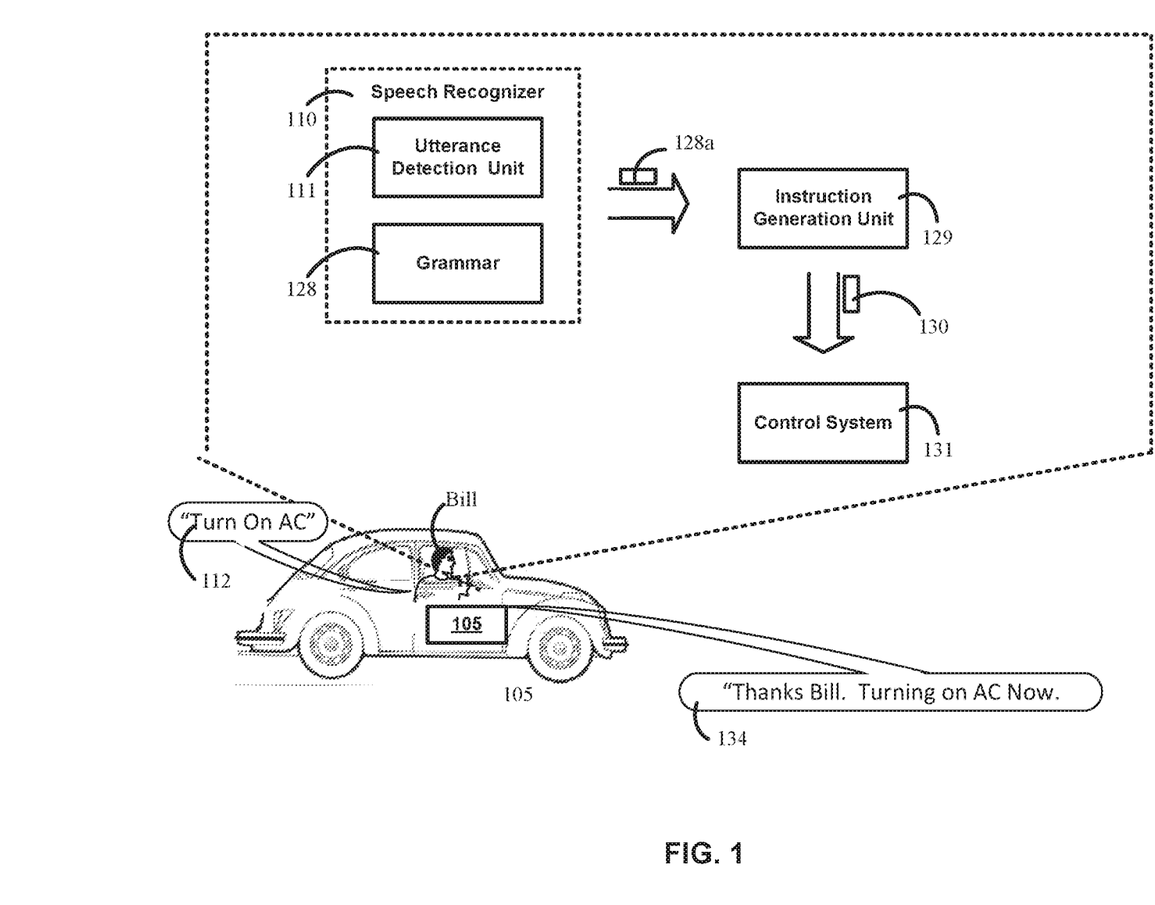
FIG. 1 is a contextual diagram of an example of a system for executing an offline voice command.

FIG. 1 is a contextual diagram of an example of a system 100 for executing an offline voice command 112. The system 100 includes a user device 105, a speech recognizer 110, an instruction generation unit 129, and one or more control systems 131.

The user device 105 can include any device that includes one or more processors to and one or more memory units storing instructions that, when executed by the one or more processors, realize the functionality of a speech recognizer 110, an instruction generation unit 129, and one or more control system 131, as described herein. In the example of FIG. 1, the user device 105 is a computing system of a vehicle. However, the present disclosure need not be so limited. For example, other types of user devices 105 may include a smartphone, a smartwatch, a tablet computer, a smart speaker, a headset, a television, a thermostat, or the like.

The speech recognition unit 110 includes an utterance detection unit 111 and a grammar 128. The utterance detection unit 111 can analyze audio data detected by one or more microphones for the occurrence of an utterance 112 by a user, (in this case, the user's name is Bill). The utterance 112 may include a command such as "Turn on AC." Other types of commands may include, for example, "Tune to 99.7," "Increase the volume," "Roll down the window," or the like. In some implementations, the utterance detection unit 111 may be configured to perform additional functionality. For example, the utterance detection unit 111 may be configured to generate a transcription of audio data that the utterance detection unit 111 captures using the one or more microphones. The transcription may include a text version of the audio data that was captured by the one or more microphones in response to Bill's utterance.

The speech recognition unit 110 can use the grammar 128 to identify a particular operation that should be performed in response to the uttered command. The grammar 128 may include a set of one or more rules that can be applied to one or more words of the transcription of an utterance to determine the meaning of the utterance. In some implementations, the grammar 128 may use a set of one or more rules to associate one or more particular words with a particular operation. For example, the speech recognition unit 110 can identify a particular operation 128a based on a comparison of one or more words of the transcription to one or more terminals and non-terminal of a grammar rule.

The speech recognizer 110 can provide data representing the particular operation 128a to an instruction generation unit 129. The instruction generation unit 129 can generate a data object 140 (e.g., instructions or commands), based on the received data representing the particular operation 128a, that, when executed by control system 141, results in the causing the user device to perform the particular operations.

The control system 141 may include one or more processing units, one or more memory units, and software code that is configured to receive a data object 140, process the data objection 140, and instruct one or more components of a user device 105 to perform the particular operation. In some implementations, the control system 141 may include one or more primary processing units, the one or more primary memory units, and software code of the user device 105. Alternatively, the one or more control units may be a separate subsystem of a user device such as climate control circuitry of a vehicle, a home, or the like. In such implementations, the control system 141 may include one or more processing units, one or more memory units, software code, or a combination thereof that is (or are) not the primary processing unit or the processing memory units. Alternatively, the control system 141 may be only software that is used to start, stop, or both, particular operations that can be performed, or are being performed, respectively, by the user device 105.

By way of example, the grammar 128 may associate the set of words "turn on AC" with an operation of turning on the air conditioner in a vehicle. Accordingly, in response to the speech recognizer 110 generating a transcription of an uttered voice command that includes the set of words "turn on AC," the speech recognizer can apply the grammar 128 rules to determine that the vehicle should perform the operation of turning on the air conditioner in the vehicle. The speech recognizer can provide data representing the operation of "turn on the air conditioner" to the instruction generation unit 129. The instruction generation unit 129 can generate a data object that, when executed by a control system 141, results in the air conditioner being turned on and used to cool the vehicle. Digital assistant technology associated with the speech recognizer 110 may output a message to Bill through a speaker of the vehicle which recites "Thanks Bill. Turning on AC Now."

The system 100 of FIG. 1 can perform well offline for a limited set of offline commands that are programmed into the grammar for all users of the device so long as a user such as Bill knows the particular command to initiate performance of the particular operation that Bill wants performed by the user device 105. However, the system 100 of FIG. 1 fails when a user such as Bill wants to use his own personalized language to perform an operation.

For example, when Bill wants to turn on the air conditioner in his home, Bill may use personalized language to ask another family member in his home to turn on the air conditioner by telling the family member to "freeze me!" As a result, when Bill climbs into his vehicle on a hot day Bill may reflexively say "freeze me!" in an effort to get the air conditioner to turn on and start cooling down the inside of the vehicle. If Bill uttered such an offline command in a vehicle equipped with the system of FIG. 1, then the vehicle's climate and entertainment system would not respond. Alternatively, vehicle's climate and entertainment system (or related digital assistant technology) may respond with a message to the effect of "Sorry, I do not understand that command. Please submit another command," or the like. This is because the grammar of the speech recognizer used by the user device 105 does not include a set of rules for resolving the uttered command of "Freeze Me." The system of FIG. 2A provides a system that enables the speech recognizer's 110 grammar 128 to learn Bill's personalized command of "Freeze Me" so that Bill may utter an offline command "Freeze Me" and have the vehicle turn on the air conditioner in response.

Figure 2A:
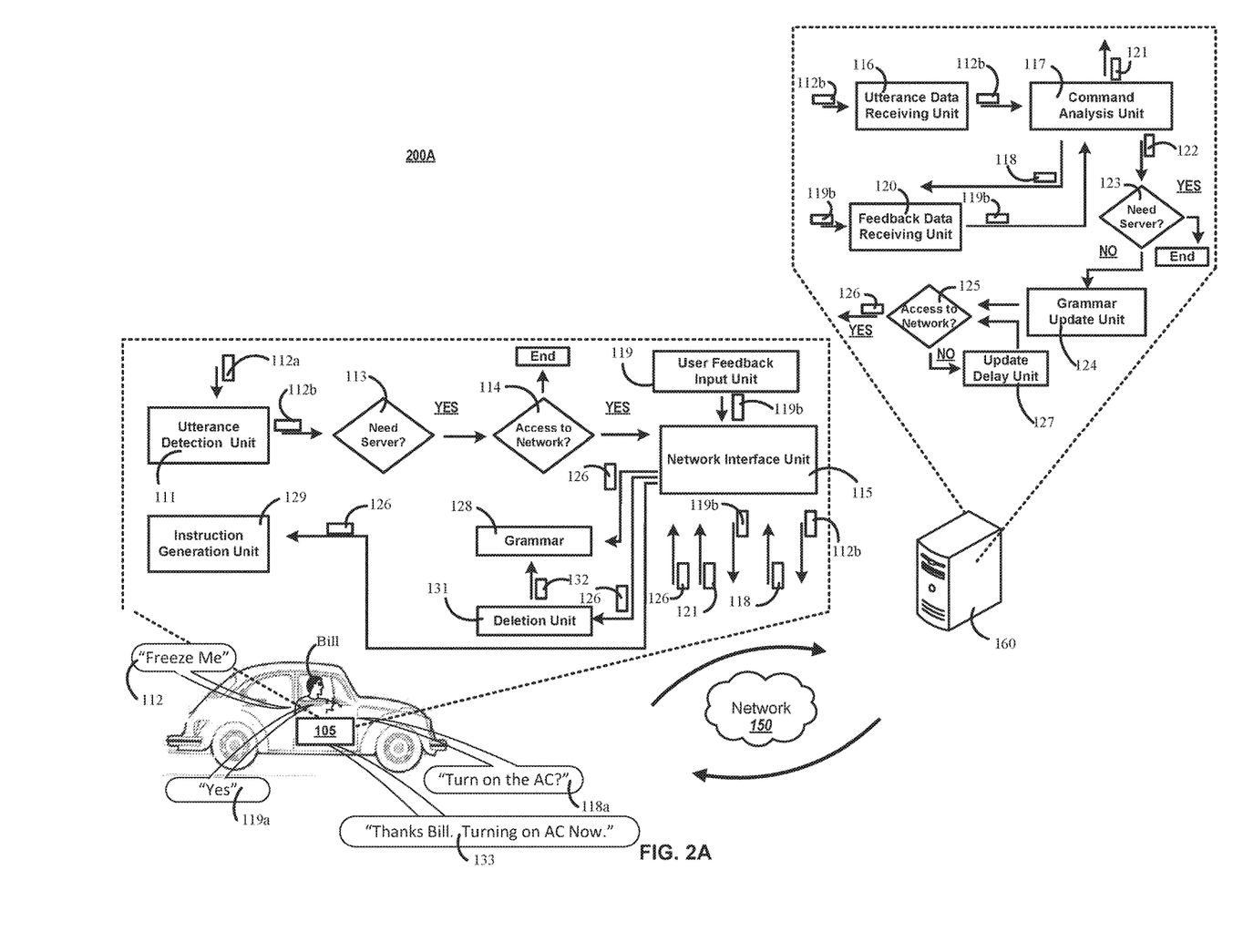
FIG. 2A is a contextual diagram of an example of a system for learning offline voice commands

FIG. 2A is a contextual diagram of an example of a system 200A for learning offline voice commands. The system 200A includes a user device 105, a network 150, and a server 160. The user device 105 may include an utterance detection unit 111, one or more logic determination units 113, 114, a network interface 115, a user feedback input unit 119, a local grammar 128, an instruction generation unit 129, and a deletion unit 131.

The server 160 may include an utterance receiving unit 116, a command analysis unit 117, a feedback data receiving unit 120, one or more logic determination units 123, 125, a grammar update unit 124, and an update delay unit 127. In this specification, the term "unit" will be used broadly to refer to a software system or subsystem that, when executed by one or more computers, cause the performance of one or more specific functions. Generally, a unit will be implemented as one or more software modules or components installed on the same computer or computers; in other cases, one or more software modules or components may be installed on one or more computers in one or more locations.

With reference to the contextual example of FIG. 2A, a user such as Bill can decide that the temperature is too hot and can utter a command to turn on the air conditioner. For example, a user Bill, speaking in his own vernacular, may utter the command "Freeze Me" 112 in an attempt to turn on the air conditioner. The command "Freeze Me" 112, at the time of Bill's utterance of the command "Freeze Me" 112, was not previously associated with one or more rules of the local grammar 128 of the user device 105.

One or more microphones of the user device 105 may detect the uttered command "Freeze Me" 112 and generate audio data 112a based on the detected utterance. The generated audio data 112a may include an electrical analog signal that is proportional to the acoustic sound wave created by Bill's voice when Bill utters the command "Freeze Me" 112. The utterance detection unit 111 can analyze the audio data 112a generated by the one or more microphones of the user device 105 and detect the occurrence of the command "Freeze Me" 112. In some implementations, the utterance detection unit 111 can generate a transcription 112b of the audio data 112a and perform one or more of the operations below based on the transcription 112b of the audio data 112a. Alternatively, in other implementations, the user device 105 may perform one or more of the operations described below on the audio data 112a, and then provide the audio data 112a to the server 160 for transcription and further processing by one or more units of the server 160 described herein.

The user device 105 may use a first logic unit 113 to determine whether the server 160 (or another server such as a content server) is required to disambiguate and perform one or more operations in response to the command "Freeze Me" 112. For example, the first logic unit 113 may be configured to receive the audio data 112a, the transcription 112b, or both, and analyze the received audio data 112a, the received transcription 112b, or both, to determine whether the server 160 is required to disambiguate and perform one or more operations in response to the command "Freeze Me" 112.

The user device 105 may determine that the server 160 (or another server such as a content server) is required to execute the command "Freeze Me" 112 for a variety of different reasons. For example, the user device 105 may determine that the server 160 (or another server such as a content server) is required to execute a command that inherently requires data from a remote server such as server 160 (or another server such as a content server) to execute the command. Commands that inherently require data from a remote server such as server 160 (or another server such as a content server) in order to execute include commands such as "What is the weather like in Paris today," "Order me a large pizza from Tony's Pizza," "Tell me the score of the Steeler game," or the like. Commands such as these inherently require data from a remote server such as server 160 (or another server such as a content server) because each of the respective commands require communication with one or more remote servers to fully execute the received command in a manner that a user such as Bill is likely to find satisfactory (e.g., by retrieving a real-time weather forecast for Paris from a remote server, by placing an order for Pizza with a server of a pizza shop, by retrieving the current score of the Steeler game from a server tracking scores of one or more sporting events).

Another reason the server 160 (or another server such as a content server) may be required to execute the command "Freeze Me" 112 is because the user device 105 may determine that the local grammar 128 of the user device 105 does not include one or more rules that define the operation that should be performed based on the command "Freeze Me." In such instances, the user device 105 may provide the data representing the uttered command such as a transcription 112b of the uttered command 112, audio data 112a representing the uttered command 112 that can be transcribed by the server 160, or both, to the server for disambiguation. Alternatively, if the user device 105 determines that the local grammar 128 does define one or more rules for disambiguating the command "Freeze Me" 112, then the user device 105 may use the local grammar 128 to disambiguate the command "Freeze Me" 112.

If the uttered command is determined to not need a server 160 (or another server such as a content server) and the local grammar 128 defines one or more rules for disambiguating the command, then the user device can use the local grammar 128 to disambiguate and execute the received command 112. For example, the user device 105 may perform a search of entries in the grammar 128 based on one or more portions of the transcription 112b of the command 112 to identify one or more rules that define the operation(s) that should be performed based on the received command "Freeze Me" 112. In the example of FIG. 2A, the local grammar 128 does not define one or more rules for disambiguating the command "Freeze Me" 112 at the time the command "Freeze Me" 112 is uttered by Bill. As a result, the local grammar 128 needs to be updated using the techniques described herein.

Alternatively, if the user device 105 needs a server 160 (or another server such as a content server) to disambiguate and execute the command 112, then the user device 105 may use a second logic unit 114 to determine whether the user device 105 has access to a network 150 to communicate with the server 160 (or another server such as a content server). For example, the user device 105 may determine whether the network interface unit 115 of the user device 105 is within range of, and has permission to access, one or more wireless networks of the network 150 such as a WiFi network, a cellular network, or the like.

If the user device 105 determines that it does not have access to the network 150, the user device can attempt to execute the command "Freeze Me" 112 using the local grammar 128 of the user device 105. However, if the local grammar 128 does not include any rules for resolving the uttered command of "Freeze Me," then the user device may provide an output to Bill indicating that the command cannot be executed. Alternatively, if the user device 105 determines that the user device 105 has access to the network 150, the user device 105 can communicate with the server 160 for assistance related to disambiguating and executing the command "Freeze Me" 112.

In the example of FIG. 2A, the user device 105 determines that the user device 105 is connected to the network 150 and that the server 160 is required to disambiguate the command "Freeze Me" 112. In the example of 2A, the server 160 is required to help disambiguate and execute the command "Freeze Me" 112 since the local grammar 128 does not include one or more rules for disambiguating the command "Freeze Me" 112. The user device 105 may use the network interface unit 115 to transmit the transcription 112b of the uttered command 112, the audio data 112a representing the uttered command 112, or both, to the server 160 for disambiguation.

With reference to FIG. 2A, the user device 105 is disclosed as including two logic units 113, 114 for illustrative purposes. However, the present disclosure need not be so limited. For example, a single logic unit may be used to provide the functionality of logic unit 113, 114 respectively.

The server 160 can receive the transcription 112b of the uttered command 112, the audio data 112a representing the uttered command 112, or both, using an utterance data receiving unit 116. The utterance data receiving unit 116 is an interface between the server 160 and the user device 105. In some implementations, such as when the utterance receiving unit 116 receives audio data 112a representing the uttered command 112, the utterance data receiving unit 116 can be configured to generate a transcription of the uttered command 112 based on the audio data 112a. The utterance data receiving unit 116 may provide the transcription 112b of the uttered command 112 to the command analysis unit 117. In other implementations, such as the example of FIG. 2A, the utterance data receiving unit 116 may receive a transcription 112b of the uttered command 112 and the forward the transcription 112b to the command analysis unit 117.

The command analysis unit 117 can be used to disambiguate a command that was not previously defined by the local grammar 130 of the user device. The command analysis unit 117 may disambiguate a command in a number of ways. For example, the command analysis 117 may associate the command "Freeze Me" with turning on the air conditioner based on an analysis of the keywords of the command, based on a user's response to a request for feedback from Bill regarding the command, based on historical aggregation of Bill's feedback related to the command, based on a comparison of the keywords of the command to a grammar maintained by the server 160 that is more extensive than the grammar 130 stored on the user device 105 and has already learned that the command, or a combination thereof.

With respect to the example of FIG. 2A, the command analysis unit 117 may determine, based on an analysis of the keywords in the command "Freeze Me" 112, that the command 112 is associated with a particular operation such as turning on an air conditioner. Based on this determination, the command analysis unit 117 may generate and transmit prompt data 118 for user feedback from Bill that identifies a particular operation. For example, the command analysis unit may generate and transmit prompt data, that when processed for output by the user device 105, asks Bill whether Bill wants to "Turn on the AC?". The prompt data 118 is received by the network interface unit 115 and output by one or more interface units of the device 105. The interface units may include a speaker, a graphical user interface, or both.

For example, prompt data 118 may be received by the user device 105 and processed to generate the output 118a phrase "Turn on AC?". In some implementations, the output 118a may be an audio prompt that is output by the one or more speakers of the user device 105. In other implementations, the output may be text rendered on the display of a user interface of the user device 105. In yet other implementations, the output 118a may be provided via a speaker or display of a different user device that is associated with Bill and the user device 105 via a cloud service. The different user device may include, for example, a smartphone, a tablet, a smartwatch, or the like.

Bill may provide feedback 119a in response to the output 118a generated based on the prompt data 118 that indicates whether or not the particular operation identified by the command analysis unit 117 should be associated with the command 112 uttered by Bill. For example, Bill can provide feedback indicating that the particular operation (e.g., turn on air conditioner) identified by the command analysis unit 117 should be associated with the command 112 (e.g., "Freeze Me") uttered by Bill. Alternatively, Bill can provide feedback indicating that the particular operation (e.g., turn on air conditioner) identified by the command analysis unit 118 should not be associated with the command 112 (e.g., "Freeze Me"). In the example of FIG. 2A, Bill's feedback 119a includes an utterance that is detected by one or more microphones of the user device 105. Alternatively, or in addition, Bill's feedback may also include a selection of one or more options of a graphical user interface of the user device 105, an utterance detected by a different user device such as a smartphone, a tablet, a smartwatch, or the like that is associated with Bill and the user device 105 via a cloud service.

In the example of FIG. 2A, Bill may provide feedback to the output 118a prompt "Turn on the AC?" by uttering the word "Yes" 119a. One or more microphones of the user device 105 may detect the Bill's utterance and generate audio data based on the detected utterance. The generated audio data may include an electrical analog signal that is proportional to the acoustic sound wave created by Bill's voice when Bill utters the feedback 119 "Yes." A user feedback input unit can receive the audio data generated based on the uttered feedback 119a, analyze the audio data generated based on the uttered feedback 119a, and detect the occurrence of the feedback 119 phrase "Yes." In some implementations, the user feedback input unit 119 can generate a transcription 119bn of the audio data generated based on the uttered feedback 119a and perform one or more of the operations based on the transcription 119b of the audio data generated based on the uttered feedback 119a. The user device 119b may use the network interface unit 115 to transmit the transcription 119b to the server 160 using one or more networks 150. Alternatively, in other implementations, the user device 105 provide the audio data generated based on the uttered feedback 119a to the server 160 via the network 150. In such instances, the server 160 may generate the transcription of the received audio data generated based on the uttered feedback 119a.

A feedback data receiving unit 120 may receive the transcription 119b of the uttered feedback 119a and provide the transcription 119b to the command analysis unit 117. Alternatively, the feedback data receiving unit 120 may receive audio data generated based on the uttered feedback 119a, generate a transcription 119b of the audio data generated based on the uttered feedback 119a, and then provide the transcription 119b of the uttered feedback 119a to the command analysis unit 117.

In response to receiving the transcription 119b of the uttered feedback 119a, the command analysis unit 117 may transmit response data 121 to the user device 105 via the network 150. The user device 105 can receive the response data 121 using the network interface unit 115 and process response data 121 to generate an output 133 confirming the association of the command "Freeze Me" 112 with the particular operation of "turning on the air conditioner" of the environment associated with the user device 105. The output 133 may include output provided via a speaker of the user device 105, output provided via a display of the user device 105, output provided by a speaker of a different user device (e.g., smartphone, tablet, smartwatch, or the like), output provided by a display of a different user device (e.g., a smartphone, tablet, smartwatch, or the like), or a combination thereof. In some implementations, the output 133 may include output that identifies the particular operation that the command analysis unit 117 associated with the command "Freeze Me." For example, the output 133 may include output from a speaker of the user device 105 that vocalizes output of "Thanks Bill. Turning on the AC Now."

The command analysis unit 117 can initiate generation of an update to the local grammar 128 of the user device 105. In some implementations, initiating generation of an update to the local grammar 128 of the user device 105 may include, for example, instructing a third logic unit 123 to evaluate data 122 identifying the uttered command 112 to determine whether the uttered command requires the server 160. In some implementations, the determination of whether the uttered command 112 requires the server 160 may be based on the particular operation the command analysis unit 117 associated with the uttered command 112. If the third logic unit 123 determines that the uttered command 112 (or the particular operation the command analysis unit 117 associated therewith) requires the server 160, then the server 160 may cease generation of the update to the local grammar 128. Alternatively, if the third logic unit 123 determines that the uttered command 112 and the particular operation the command analysis unit 117 associated therewith does not require the server 160, then the result of the third logic unit's 123 processing may provide an indication to the grammar update unit 124 to generate an update for the local grammar 128 of the user device 105.

Generating the update can include generating a plurality of instructions that are configured to, upon execution of the instructions by the user device 105 during processing of the update, create a set of one or more rules in the local grammar 128 that associate the user command (e.g., "Freeze Me") with the particular operation (e.g., "turn on the air conditioner") in the local grammar 128 of the user device 105. In some implementations, generating the local grammar update may also include a generating a data object that, when executed by the user device 105, causes the user device 105 to initiate performance of the particular operation (e.g., "turn on air conditioner") responsive to a subsequent utterance of the command 112 (e.g., "Freeze Me."). The data object may include an XML data object, a binary data object, or the like. In some implementations, generating the local grammar update may also include generating expiration data that includes a maximum period of time that the set of one or more rules associated with the local grammar update will be stored in the local grammar 128 without being used.

Each updating methodology provides particular advantages. For example, generating an update that includes a plurality of instructions to create a set of one or more rules in the local grammar 128 to associate the user command (e.g., "Freeze Me") with the particular operation (e.g., "turning on the air conditioner") without the generated data object results in an update package of a smaller size (relative to an update package that includes the generated data object). Accordingly, this update methodology may be used to conserve bandwidth less data would need to be provided to the user device 105 to facilitate updating the local grammar 128. In addition, update download times may be faster by downloading the plurality of instructions without the generated data object. In addition, this updating methodology also leads to better recognition as there are fewer possible matches. For example, an utterance such as "Freeze We," "Sneeze Me," or the like may also be corrected to "Freeze Me" if the words of the utterance do not match words in the local grammar 128. However, this update methodology will require an instruction generation unit 129 to generate the data object.

Alternatively, different benefits can be achieved by generating the data object and providing the data object with the grammar update for storage on the user device 105 may increase performance of the user device 105. This is because it saves the user device 105 from having to generate the data object in response the user device 105 identifying the particular operation as being associated subsequent utterances of the command 112. Because the user device 105 can merely access the data object (as opposed to generating the data object), such embodiments can reduce the latency involved in the user device executing the particular operation responsive to subsequent utterances of the command "Freeze Me."

Yet different benefits can be achieved by generating and providing expiration data with the local grammar update. For example, the system 200A can use the expiration data as a mechanism for optimizing use of storage space by the user device 105. That is, the user device 105 can free-up storage space allocated to store a set of rules associating an uttered command with a particular operation if Bill does not utter the command within the maximum period of time set forth in the expiration data.

The grammar update unit 124 produces the local grammar update 126 and uses a fourth logic unit 125 to determine whether or not the server 160 has access to a network 150 that facilitates communication with the user device 105. If the fourth logic unit 125 determines that the server 160 does not have access to a network 150 that facilitates communication with the user device 105, then the fourth logic unit 125 instruct a local grammar update delay unit 127 that the server 160 cannot communicate with the user device 105 at this time. The local grammar update delay unit 127 can delay subsequent attempts to provide the local grammar update 126 to the user device 105 for a predetermined amount of time. In response to the expiration of the predetermined amount of time, the update delay unit 127 can use the fourth logic unit 125 to determine whether or not the server 160 has access to a network 150 that facilitates communication with the user device 105.

Alternatively, if the fourth logic unit 125 determines that the server 160 does have access to a network 150 that facilitates communication with the user device 105, then the server 160 can provide the local grammar update 126 to the user device 105. The user device 105 can receive the local grammar update via the network interface unit 115.

The user device 105 may process the instructions included in the local grammar update 126 and update the local grammar 128 by generating a set of one or more rules for storage in the local grammar 128. The generation and storage of the set of one or more rules in the local grammar 128 enable the local grammar 128 to disambiguate subsequently received commands that correspond one of the commands that were part of the local grammar update 126. For example, the one or more rules can be applied to one or more words of the transcription of a subsequent utterance to determine the meaning of the subsequent utterance. Determining a meaning of a subsequent utterance may include, for example, a identifying an operation that should be performed in response to the detection of the subsequent utterance. Accordingly, after receiving and processing the local grammar update 126, the user device 150 can use the local grammar 128 to disambiguate subsequent utterances of the command "Freeze Me" by using one or more rules in the local grammar 128 to associate the "Freeze Me" command with the particular operation of "turning on the air conditioner."

The instruction generation unit 129 can also be updated based on the local grammar update 126. In some implementations, for example, the local grammar update 126 may include an action that is to be initiated, performed, or both, by the user device 105 in response to the an uttered command. The action may include a data object that, when executed by the user device 105, causes the user device 105 to initiate performance of (or to perform) the particular operation (e.g., "turning on air conditioner") that is associated with an uttered command (e.g., "Freeze Me.") by the local grammar 128. The data object may include an XML data object, a binary data object, or the like. If the local grammar update 126 includes the action that that is to be initiated, performed, or both, by the user device 105 in response to an uttered command, the action can be stored in the instruction generation unit 129. Once stored in the instruction generation unit 129, the action (e.g., data object that instructs the user device 105 to turn on the air conditioner) may be retrieved upon after receipt of the utterance of a corresponding command (e.g., "Freeze Me") based on data provided by the local grammar 128 that identifies a particular operation associated with the utterance. Alternatively, the action (e.g., data object that instructs the user device 105 to turn on the air conditioner) may be generated by the instruction generation unit 129 after receipt of the utterance of a corresponding comment (e.g., "Freeze Me") based on data provided by the local grammar 128 that identifies a particular operation associated with the utterance.

Other units may also be updated based on the local grammar update 126. For example, the deletion unit 131 may be updated to monitoring the usage of one or more sets of rules that are included in the local grammar 128. In some implementations, a set of grammar rules may be associated with a maximum period of time for which the set of grammar rules may be idle (e.g., not used). The deletion unit 131 may determine whether or not a command that is associated with a set of grammar rules has been uttered within the maximum period of time. In response to determining that the command has not been uttered, or otherwise input, within the maximum period of time, the deletion unit 131 may instruct 132 the local grammar 128 to delete the set of rules from the local grammar 128. This feature provides the benefit of optimizes the use of local user device storage, which may be finite.

Though deletion unit 131 has been described as removing a set of one or more rules from the local grammar 128 based a determination that a command associated with the set of one or more rules has not been uttered, or otherwise input, within a maximum period of time, the present disclosure need not be so limited. Instead, the deletion unit 128 may detect the occurrence of one or more other triggers whose detection initiates removal (e.g., deletion) of a set of one or more rules associated with a particular command in the local grammar 128. Such triggers may include changes in the state of the user device 105 such as removal of a user account, selection of a different language for the user device 105, a deletion request received from a user (e.g., Bill), a request to reset the device received from a user (e.g., Bill), or the like.

Figure 2B:
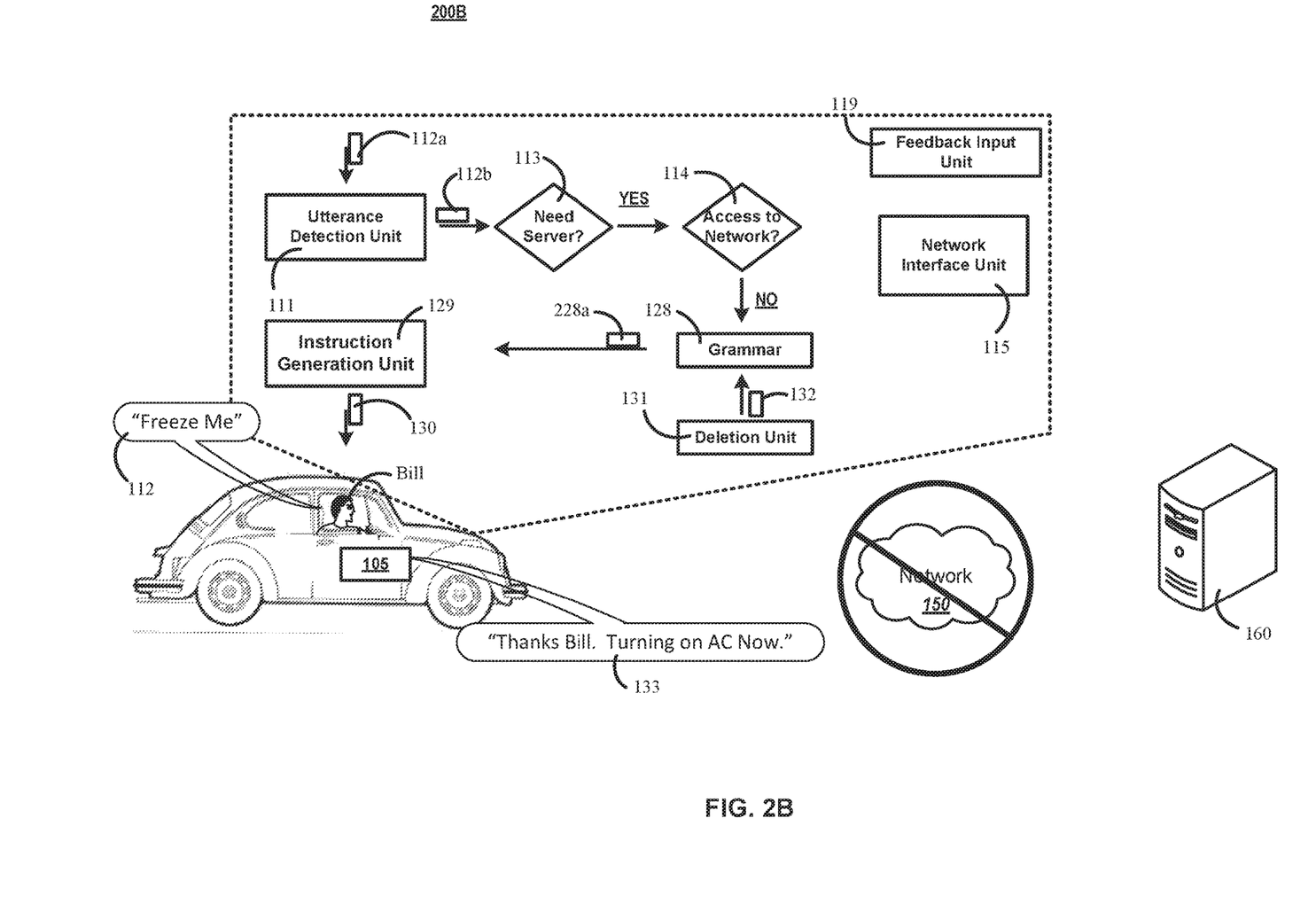
FIG. 2B is a contextual diagram of the system of FIG. 2A that has learned an offline voice command.

In the example of FIG. 2B, the user device that detected Bill's utterance of a previously unknown command (e.g., "Freeze Me") and the user device that received and processed the local grammar update 126 were the same user device—i.e., user device 105. However, the present disclosure need not be so limited. Instead, for example, multiple user devices may be associated with Bill via one or more cloud services. In such instances, the server 160 can transmit the local grammar update such as local grammar update 126 to each of the other devices associated with Bill via the one or more cloud services. For example, the local grammar update can also be transmitted to Bills smartphone, smartwatch, laptop computer, tablet computer, desktop computer, smart television, set top box, smart speaker, digital home assistant, or the like. In this way, the local grammar of each of Bill's user devices can be updated to respond to commands in Bill's own vernacular. Once updated, these user devices can be used to respond to commands in Bill's own vernacular even when offline.

FIG. 2B is a contextual diagram of the system of FIG. 2A that has learned an offline voice command. In general, the system 200B includes a user device 111, a first logic unit 113, a second logic unit 114, a grammar 128, an instruction generation unit 111, a deletion unit 131, a feedback input unit 119, and a network interface unit 115.

In more detail, the system 200B is the same as the system 200A except the system 200B is shown after the local grammar of 128 has received and processed the local grammar update 126. Processing of the local grammar update 126 enabled the local grammar 128 to learn a command (e.g., "Freeze Me") that was not associated within one or more rules in the local grammar 128 prior to receiving and processing the local grammar update 126. In addition, the user device 105 of FIG. 2B does not have access to the network 150. Because the user device 105 of FIG. 2B does not have access to the network 150, the user device 105 of FIG. 2B cannot communicate with the server 160 to avail itself of the command disambiguation services provided by the server 160.

With reference to FIG. 2B, the user device 105 may detect utterance of a command 112 that is uttered in Bill's own vernacular such as the command 112 "Freeze Me" that was unknown to the local grammar 128 prior to the user's device's 105 receipt and processing of the local grammar update 126.

The user device 105 may use one or more microphones to capture audio data 112a that is provided to the utterance detection unit 111. The utterance detection unit 111 may generate a transcription 112b of the audio data 112a. The user device 105 may user the first logic unit 113 to determine that the server is not needed to execute the command represented by the transcription 112b because the command does not require data from the server 160 and the local grammar 128 that was updated using the local grammar update 126 now includes the command 112 represented by the transcription 112b. The second logic unit 114 may determine that there is no access to the network 150.

The local grammar 128 may determine, based on the received a transcription 112b and a set of one or more rules stored in the local grammar that were received as part of the local grammar update 126, that the command 112 (e.g., "Freeze Me") is associated with a particular operation (e.g., turning on the air conditioner). The local grammar may transmit data 228a instruction generation unit 129 that identifies the particular operation (e.g., turning on the air conditioner) that is associated with the command 112.

The instruction generation unit 129 may obtain an action 130, based on the particular operation identified in the data 228a received from the local grammar 128, that when, executed, initiates performance of a particular operation (e.g., turning on the air conditioner) that should be performed in response to the command 112. In some implementations, the action 130 may have been previously received and stored by the instructions generation unit 129 as party of the local grammar update 126. In such implementations, the latency for executing the particular operation in response to the command 112 may be reduced by storing the action 130 on the user device 150. Alternatively, obtaining the action 130 may include, for example, generating the action 130.

The action 130 may include a data object that, when executed by the user device 105, causes the user device 105 to initiate performance of the particular operation (e.g., "turning on air conditioner") responsive to a subsequent utterance of the command 112 (e.g., "Freeze Me."). The data object may include an XML data object, a binary data object, or the like. The action 130 may be processed by the user device 105 and trigger the performance of the particular operation (e.g., turning on the air conditioner).

Figure 3:
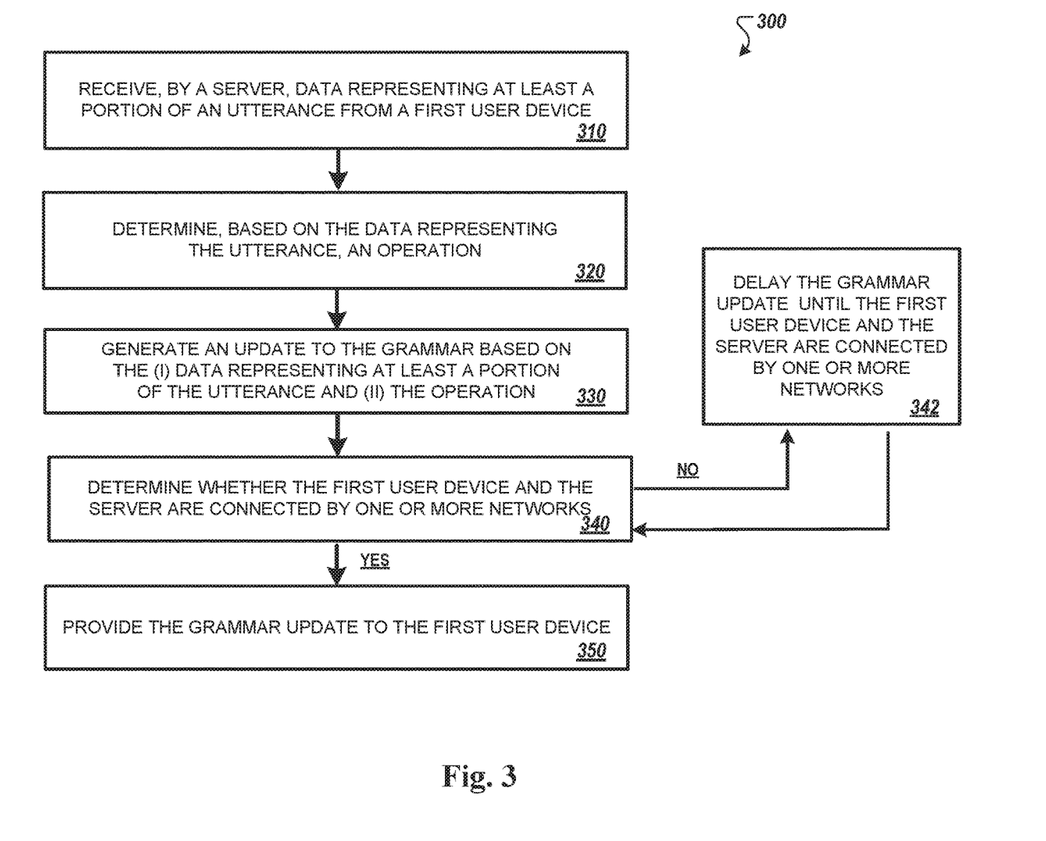
FIG. 3 is a flowchart of an example of a process for generating a personalized grammar update for a user device.

FIG. 3 is a flowchart of an example of a process 300 for generating a personalized grammar update for a user device. For convenience, the process 300 is described below as being performed by a system such as the system 200A depicted in FIG. 2A.

The system may use a server to receive 310 data representing at least a portion of an utterance from a first user device. The data representing the portion of the utterance may include a transcription of one or more portions of the utterance. Alternatively, the data representing the portion of the utterance may include audio data representing one or more portions of the utterance. The utterance may include a command in the unique vernacular of a user for a known operation. For example, the utterance may include a command to "Hurt My Ears." In this example, the user may utter the command "Hurt My Ears" as a request to perform the operation of "increasing the volume of audio (or video) playback by the first user device."

The system may determine 320, based on the data representing the utterance, an operation that can be performed responsive to the utterance. In some implementations, the operation may be an operation that can be performed without requesting server information. For example, the system may determine that the operation of "increasing the volume of audio (or video) playback by a device" is an operation that can be performed without requesting server information.

The system may generate 330 an update to the grammar based on the (I) data representing at least a portion of the utterance and (II) the operation. Generating an update to the grammar may include generating a plurality of instructions that are configured to, upon execution of the instructions by the first user device during processing of the update, create a set of one or more rules in a grammar of the first user device that associates the user command (e.g., "Hurt My Ears") with the particular operation (e.g., "increasing the volume of audio (or video) playback by the first").

In some implementations, generating the update to the grammar may also include generating a data object that, when executed by the first user device, causes the first user device to initiate performance of the particular operation (e.g., "increasing the volume of audio (or video) playback by the first user device") responsive to a subsequent utterance of the command. The data object may include an XML data object, a binary data object, or the like. In some implementations, generating the grammar update may also include generating expiration data that includes a maximum period of time that the set of one or more rules associated with the grammar update will be stored in the grammar without being used.

The system may determine 340 whether the first device and the first device and the server are connected by one or more networks. In response to determining that the first user device and the server are connected by one or more networks, then the system may provide 350 the grammar update to the first user device.

Alternatively, in response to determining that the first user device and the server are not connected by one or more networks, the system may proceed to stage 342 and delay 342 the grammar update until the first user device and the server are connected by one or more networks. In such instances, the system may continue to stage 350 and provide the grammar update to the first user device after determining that a connection has been established between the first user device and the server.

Figure 4:
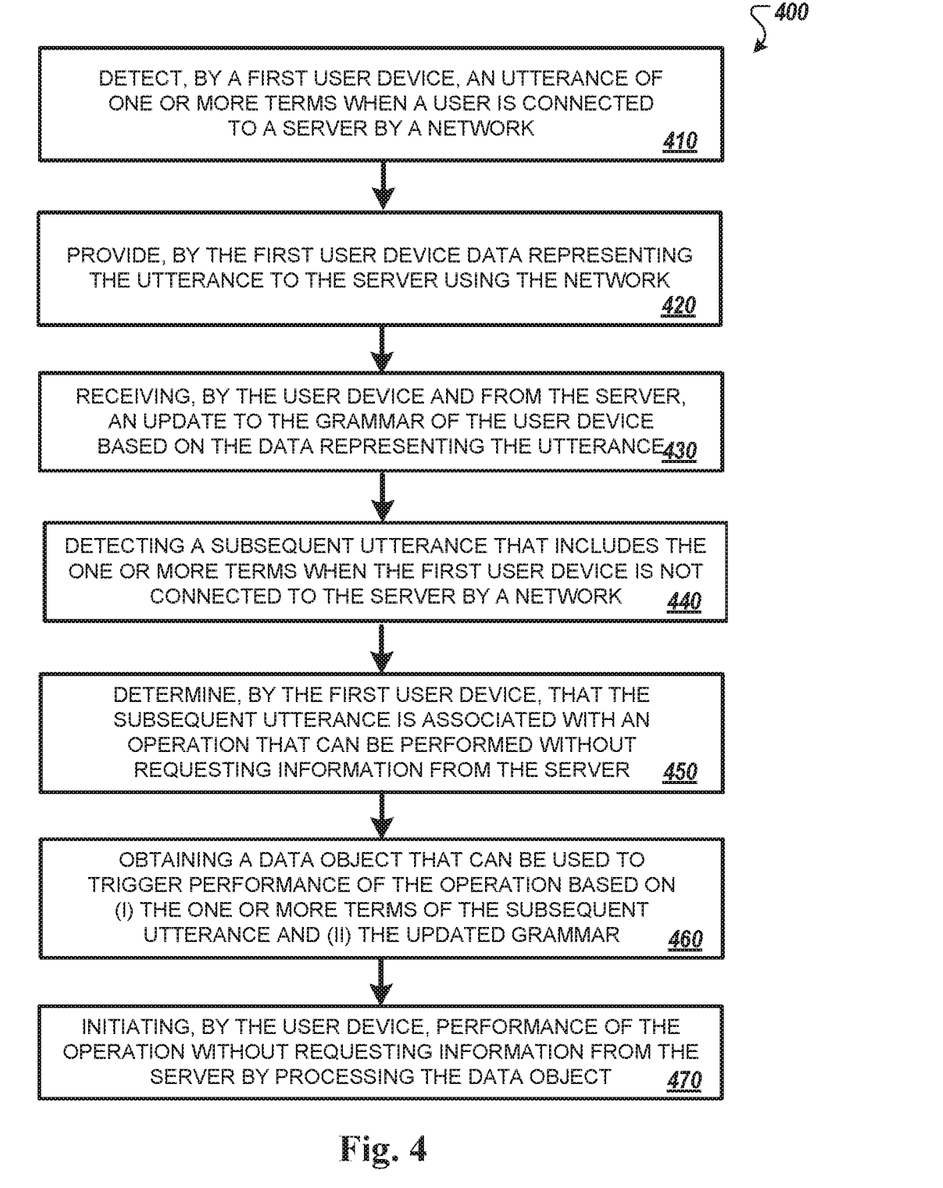
FIG. 4 is a flowchart of an example of a process for personalizing a grammar of a user device.

FIG. 4 is a flowchart of an example of a process 400 for personalizing a grammar of a user device. For convenience, the process 400 is described below as being performed by a system such as the system 200A depicted in FIG. 2A.

The system can detect 410, using a first user device, an utterance of one or more terms when a user is connected to a server by a network. For example, the first user device may use one or more microphones to capture audio data that represents the utterance. By way of example, the utterance may include a command in the user's own vernacular to "Hurt My Ears."

The system can provide 420, using the first device, data representing the utterance to the server using the network. For example, the system may provide the captured audio data describing all, or a portion of, the utterance to the server. Alternatively, or in addition, the system may provide a transcription of all, or a portion of the utterance to the server. By way of example, the first device may provide a transcription of audio data that represents the command "Hurt My Ears" to the server.

The system can receive 430, by the user device and from the server, an update to the grammar of the user device based on the data representing the utterance. Receiving the update to the grammar of the user device may include obtaining a copy of update to the grammar via a network. Alternatively, or in addition, receiving the update to the grammar may also include installing the update to the grammar. The update to the grammar of the user device may include a plurality of instructions that are configured to, upon execution of the instructions by the first user device during processing of the update, create a set of one or more rules in a grammar of the first user device that associates the user command (e.g., "Hurt My Ears") with the particular operation (e.g., "increasing the volume of audio (or video) playback by the first").

In some implementations, the update to the grammar may also include a data object that, when executed by the first user device, causes the first user device to initiate performance of the particular operation (e.g., "increasing the volume of audio (or video) playback by the first user device") responsive to a subsequent utterance of the command. The data object may include an XML data object, a binary data object, or the like. In some implementations, the grammar update may also include expiration data that includes a maximum period of time that the set of one or more rules associated with the grammar update will be stored in the grammar without being used.

The system can detect 440 a subsequent utterance that includes the one or more terms when the first user device is not connected to the server by a network. For example, the first user device may use one or more microphones to capture audio data that represents the subsequent utterance. The subsequent utterance may include an utterance that was received after the receipt and processing of the update to the grammar in stage 430. For example, the subsequent utterance may include the command "Hurt My Ears" that was uttered by the user at some point in time after the update to the grammar was received in stage 430.

The system can determine 450, using the first user device, that the subsequent utterance is associated with an operation that can be performed without requesting information from the server. For example, the first user device can evaluate data representing the utterance to determine whether information from a server is required to disambiguate the utterance and perform the operation that is responsive to the utterance.

The system can obtain 460 a data object that can be used to trigger performance of the operation based on (I) the one or more terms of the subsequent utterance and (II) the updated grammar. The data object may include data that, when executed by the first user device, causes the first user device to initiate performance of an operation (e.g., "increasing the volume of audio (or video) playback by the first user device") that was associated with the utterance in the updated grammar. The data object may include an XML data object, a binary data object, or the like. The system can initiate 470, using the user device, performance of the operation without requesting information from the server by processing the data object.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), LED (light-emitting diode), or OLED (organic light-emitting diode) monitor, for displaying information to the user and a keyboard and a pointing device, e.g., a mouse, a trackball, or a touchscreen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The invention claimed is:

1. A method comprising:
   receiving, via a vehicle computing device of a vehicle, an utterance of one of more terms provided by a user and received by the vehicle computing device while the vehicle computing device is connected to a network, wherein the utterance comprises a user request to change a state of an additional device that is controlled by a control system of the vehicle;
   providing, via the vehicle computing device and in response to receiving the utterance, data representing the utterance to a server using the network;
   determining, by the server and in response to receiving the utterance, that the vehicle computing device can change the state of the additional device responsive to the utterance without requesting data from the server;
   in response to receiving the utterance:
      initiating, by the server, the changing of the state of the additional device; and
      providing, by the server, and based on determining, by the server, that the vehicle computing device can change the state of the additional device responsive to the utterance without requesting data from the server, an update to a grammar stored locally on the vehicle computing device,
         wherein the update is generated based on the data representing the utterance,
         wherein providing the update causes the grammar stored locally on the vehicle computing device to associate the one or more terms of the utterance with one or more rules stored locally on the vehicle computing device, the one or more rules being associated with changing the state of the additional device, and
         wherein prior to the update, the grammar stored locally on the vehicle computing device does not associate the one or more terms of the utterance with the one or more rules stored locally on the vehicle computing device; and
   subsequent to the vehicle computing device receiving the update to the grammar stored locally on the vehicle computing device:
      receiving, via the vehicle computing device, a second utterance provided by the user, wherein the second utterance corresponds to a second user request to change the state of the additional device that is controlled by the control system of the vehicle;
      determining, using the update to the grammar stored locally on the vehicle computing device, that the vehicle computing device can change the state of the additional device without requesting data from the server; and
      initiating, via the vehicle computing device, the changing of the state of the additional device.

2. The method of claim 1, wherein providing, by the server, the update to the grammar stored locally on the vehicle computing device includes providing the one or more terms to the first user device.

3. The method of claim 2, further comprising:
   associating the one or more terms with a predetermined time period, wherein the predetermined time period indicates a maximum period of time the one or more terms will be included in the grammar absent receiving a subsequent utterance of the one or more terms by a user to change the state of the additional device.

4. The method of claim 1, further comprising:
   generating, by the server, a data object that, when executed, causes the vehicle computing device to initiate changing the state of the additional device responsive to the utterance.

5. The method of claim 4, wherein providing, by the server, the update to the grammar stored locally on the vehicle computing device further comprises providing the generated data object to the vehicle computing device.

6. The method of claim 1, wherein the update to the grammar enables the vehicle computing device to execute a data object that initiates changing the state of the additional device in response to subsequently receiving the second utterance, and without requesting information from the server.

7. The method of claim 1, wherein determining, by the server, that the vehicle computing device can change the state of the additional device responsive to the utterance without requesting data from the server comprises:
   determining that the vehicle computing device can generate an action comprising a data object that, when executed, causes the vehicle computing device to initiate changing the state of the additional device responsive to receiving a subsequent instance of the utterance.

8. The method of claim 1, further comprising:
   identifying, by the server, a user profile that is associated with the vehicle computing device;
   identifying, by the server and based on the user profile, a second computing device that is registered to a user of the vehicle computing device; and
   providing, by the server, an update to an additional grammar stored locally on the second computing device based on the one or more terms.

9. The method of claim 1, wherein the additional device comprises one of: a speaker, a headset, a thermostat, an air conditioner, or a window.

10. The method of claim 1, wherein determining, by the server, that the vehicle computing device can change the state of the additional device responsive to the utterance without requesting data from the server includes:
  determining whether data from the server is required to disambiguate the utterance and to initialize changing the state of the additional device.

11. A system comprising:
one or more computers and one or more storage devices storing instructions that are operable, when executed by the one or more computers, to cause the one or more computers to perform operations comprising:
  receiving, by a vehicle computing device of a vehicle, an utterance of one of more terms provided by a user and received by the vehicle computing device while the vehicle computing device is connected to a network,
    wherein the utterance comprises a user request to change a state of an additional device that is controlled by a control system of the vehicle;
  providing, by the vehicle computing device and in response to receiving the utterance, data representing the utterance to a server using the network;
  determining, by the server and in response to receiving the utterance, that the vehicle computing device can change the state of the additional device responsive to the utterance without requesting data from the server;
  in response to receiving the utterance:
    initiating, by the server, the changing of the state of the additional device; and
    providing, by the server, and based on determining, by the server, that the vehicle computing device can change the state of the additional device responsive to the utterance without requesting data from the server, an update to a grammar stored locally on the vehicle computing device,
      wherein the update is generated based on the data representing the utterance,
    wherein providing the update causes the grammar stored locally on the vehicle computing device to associate the one or more terms of the utterance with one or more rules stored locally on the vehicle computing device, the one or more rules being associated with changing the state of the additional device, and
    wherein prior to the update, the grammar stored locally on the vehicle computing device does not associate the one or more terms of the utterance with the one or more rules stored locally on the vehicle computing device; and
  subsequent to the vehicle computing device receiving the update to the grammar stored locally on the vehicle computing device:
    receiving, by the vehicle computing device, a second utterance provided by the user, wherein the second utterance corresponds to a second user request to change the state of the additional device that is controlled by the control system of the vehicle;
    determining, by the vehicle computing device and based on the update to the grammar stored locally of the vehicle, that the vehicle computing device can change the state of the additional device without requesting data from the server; and
    initiating, by the vehicle computing device, the changing of the state of the additional device.

12. The system of claim 11, wherein providing, by the server, the update to the grammar stored locally on the vehicle computing device includes providing the one or more terms to the first user device.

13. The system of claim 12, the operations further comprising:
  associating the one or more terms with a predetermined time period, wherein the predetermined time period indicates a maximum period of time the one or more terms will be included in the grammar absent receiving a subsequent utterance of the one or more terms by a user to change the state of the additional device.

14. The system of claim 11, the operations further comprising:
  generating, by the server, a data object that, when executed, causes the vehicle computing device to initiate changing the state of the additional device responsive to the utterance.

15. The system of claim 14, wherein providing, by the server, the update to the grammar stored locally on the vehicle computing device further comprises providing the generated data object to the vehicle computing device.

16. The system of claim 11, wherein the update to the grammar enables the vehicle computing device to execute a data object that initiates changing the state of the additional device in response to subsequently receiving the second utterance, and without requesting information from the server.

17. The system of claim 11, wherein determining, by the server, that the vehicle computing device can change the state of the additional device responsive to the utterance without requesting data from the server comprises:
  determining that the vehicle computing device can generate an action comprising a data object that, when executed, causes the vehicle computing device to initiate changing the state of the additional device responsive to receiving a subsequent instance of the utterance.

18. The system of claim 11, the operations further comprising:
  identifying, by the server, a user profile that is associated with the vehicle computing device;
  identifying, by the server and based on the user profile, a second computing device that is registered to a user of the vehicle computing device; and
  providing, by the server, an update to an additional grammar stored locally on the second computing device based on the one or more terms.

19. The system of claim 11, wherein the additional device comprises one of: a speaker, a headset, a thermostat, an air conditioner, or a window.

20. The system of claim 11, wherein determining, by the server, that the vehicle computing device can change the state of the additional device responsive to the utterance without requesting data from the server includes:
  determining whether data from the server is required to disambiguate the utterance and to initialize changing the state of the additional device.

* * * * *